(12) United States Patent
Ochi

(10) Patent No.: US 10,414,398 B2
(45) Date of Patent: Sep. 17, 2019

(54) VEHICLE TRAVEL CONTROL DEVICE THAT CONTROLS FOLLOWING OF A VEHICLE

(71) Applicant: Hitachi Automotive Systems, Ltd., Hitachinaka-shi, Ibaraki (JP)

(72) Inventor: Isao Ochi, Hitachinaka (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 137 days.

(21) Appl. No.: 15/518,115

(22) PCT Filed: Oct. 7, 2015

(86) PCT No.: PCT/JP2015/078432
§ 371 (c)(1),
(2) Date: Apr. 10, 2017

(87) PCT Pub. No.: WO2016/084487
PCT Pub. Date: Jun. 2, 2016

(65) Prior Publication Data
US 2017/0327117 A1 Nov. 16, 2017

(30) Foreign Application Priority Data
Nov. 27, 2014 (JP) .................................. 2014-240523

(51) Int. Cl.
*G01C 22/00* (2006.01)
*B60W 30/165* (2012.01)
(Continued)

(52) U.S. Cl.
CPC ........... *B60W 30/165* (2013.01); *B60K 31/00* (2013.01); *B60T 7/12* (2013.01); *B60W 40/04* (2013.01);
(Continued)

(58) Field of Classification Search
CPC .......... B60W 30/165; B60K 31/00; B60T 7/12
See application file for complete search history.

(56) References Cited

U.S. PATENT DOCUMENTS

2009/0125204 A1 5/2009 Kudo
2011/0029195 A1* 2/2011 Yamada ................. G01C 21/00
701/36
(Continued)

FOREIGN PATENT DOCUMENTS

JP          7-84048 A      3/1995
JP       2004-220348 A     8/2004
(Continued)

OTHER PUBLICATIONS

Supplementary European Search Report issued in counterpart European Application No. 15862322.3 dated Jul. 10, 2018 (eight (8) pages).

(Continued)

*Primary Examiner* — Adam M Alharbi
(74) *Attorney, Agent, or Firm* — Crowell & Moring LLP

(57) ABSTRACT

Provided is a vehicle travel control device capable of improving the usability of a following control by detecting dangerous behavior in a preceding vehicle, and differing the release timing of the following control. A vehicle travel control device having a preceding vehicle behavior recognition means for obtaining behavior information for a preceding vehicle, a preceding vehicle behavior determination means for detecting the degree of risk of dangerous behavior in the preceding vehicle from the behavior information, and determining the feasibility of a following control targeting the preceding vehicle on the basis of the detected dangerous behavior risk degree, and a vehicle operation control means for outputting an acceleration/deceleration/braking/steering control command to an actuator on the basis of the feasibility determination for the following control, wherein dangerous (Continued)

behavior is detected on the basis of the preceding vehicle behavior information, and the timing differs between a first release timing for the following control when a first dangerous behavior is detected and a second release timing for the following control when a second dangerous behavior different from the first dangerous behavior is detected.

8 Claims, 3 Drawing Sheets

(51) Int. Cl.
    *B60K 31/00*     (2006.01)
    *B62D 6/00*     (2006.01)
    *B60T 7/12*     (2006.01)
    *G08G 1/16*     (2006.01)
    *B60W 40/04*     (2006.01)

(52) U.S. Cl.
    CPC ................. *B62D 6/00* (2013.01); *G08G 1/16* (2013.01); *B60K 2310/266* (2013.01); *B60W 2420/42* (2013.01); *B60W 2420/52* (2013.01); *B60W 2420/54* (2013.01); *B60W 2550/302* (2013.01); *B60W 2550/304* (2013.01); *B60W 2550/404* (2013.01); *B60W 2550/408* (2013.01)

(56) References Cited

U.S. PATENT DOCUMENTS

2011/0254676 A1* 10/2011 Marumoto ............ G07C 5/008
                                                        340/441
2011/0313664 A1     12/2011 Sakai et al.

FOREIGN PATENT DOCUMENTS

| JP | 2007-233965 A | 9/2007 |
|---|---|---|
| JP | 2008-87545 A | 4/2008 |
| JP | 2009-96402 A | 5/2009 |
| JP | 2010-182236 A | 8/2010 |
| WO | WO 2014/130178 A1 | 8/2014 |

OTHER PUBLICATIONS

Japanese-language Office Action issued in counterpart Japanese Application No. 2016-561443 dated Aug. 29, 2017 with English translation (24 pages).

International Search Report (PCT/ISA/210) issued in PCT Application No. PCT/JP2015/078432 dated Jan. 12, 2016 with English translation (Four (4) pages).

Japanese-language Written Opinion (PCT/ISA/237) issued in PCT Application No. PCT/JP2015/078432 dated Jan. 12, 2016 (Three (3) pages).

* cited by examiner

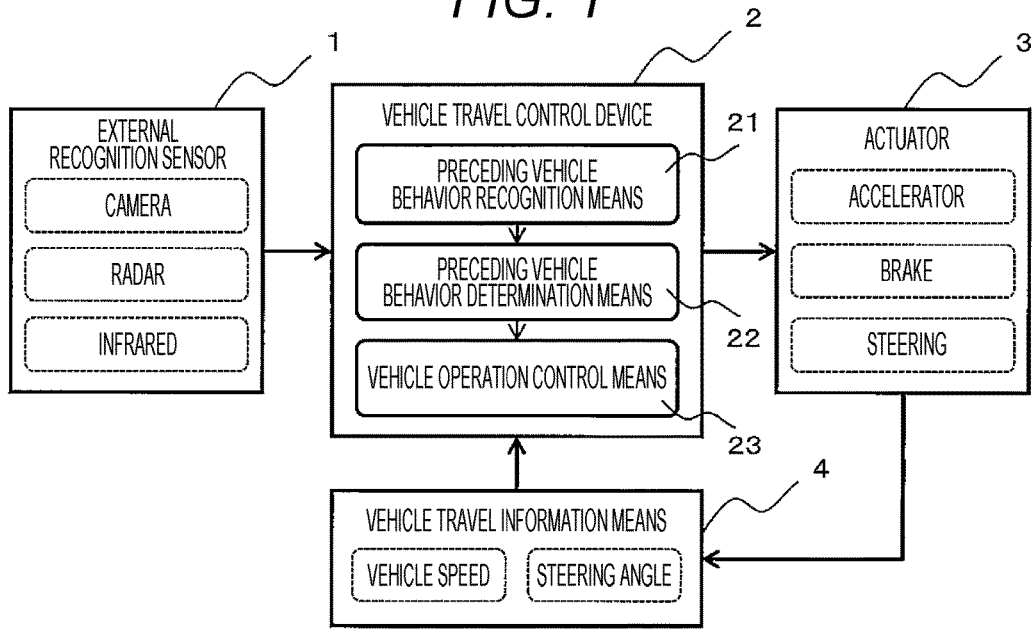

| TYPE OF DANGEROUS BEHAVIOR | DEGREE OF DANGER (5 TO 1) | DETERMINATION TARGET | DETERMINATION METHOD |
|---|---|---|---|
| EXCESS OF SPEED LIMIT | 5 | VEHICLE SPEED, LEGAL LIMIT (MAP·ROAD SIGN·TRAFFIC INFORMATION) | EXCESS OF LEGAL LIMIT |
| SUDDEN ACCELERATION | 2 TO 1 | VEHICLE SPEED | ACCELERATION CHANGE WITHIN SPECIFIED TIME |
| SUDDEN DECELERATION | 5 TO 3 | VEHICLE SPEED | DECELERATION CHANGE WITHIN SPECIFIED TIME (THERE IS DANGER OF COLLISION AND DEGREE OF DANGER IS LARGER THAN SUDDEN ACCELERATION) |
| ABRUPT STEERING | 5 TO 3 | VEHICLE SPEED, STEERING ANGLE (ESTIMATION) | COMBINATION OF VEHICLE SPEED AND STEERING ANGLE |
| UNSTEADINESS | 5 TO 1 | VEHICLE POSITION | DEGREE OF UNSTEADINESS WITHIN SPECIFIED TIME |
| NON-KEEPING OF LANE | 5 TO 3 | LANE, VEHICLE POSITION | RATE OF KEEPING LANE WITHIN SPECIFIED TIME |
| TOO SLOW | 3 TO 1 | VEHICLE SPEED, VEHICLE SPEED OF SURROUNDING VEHICLE | VEHICLE SPEED DIFFERENCE WITH SURROUNDING VEHICLE |
| TOO FAST | 3 TO 1 | VEHICLE SPEED, VEHICLE SPEED OF SURROUNDING VEHICLE | VEHICLE SPEED DIFFERENCE WITH SURROUNDING VEHICLE |

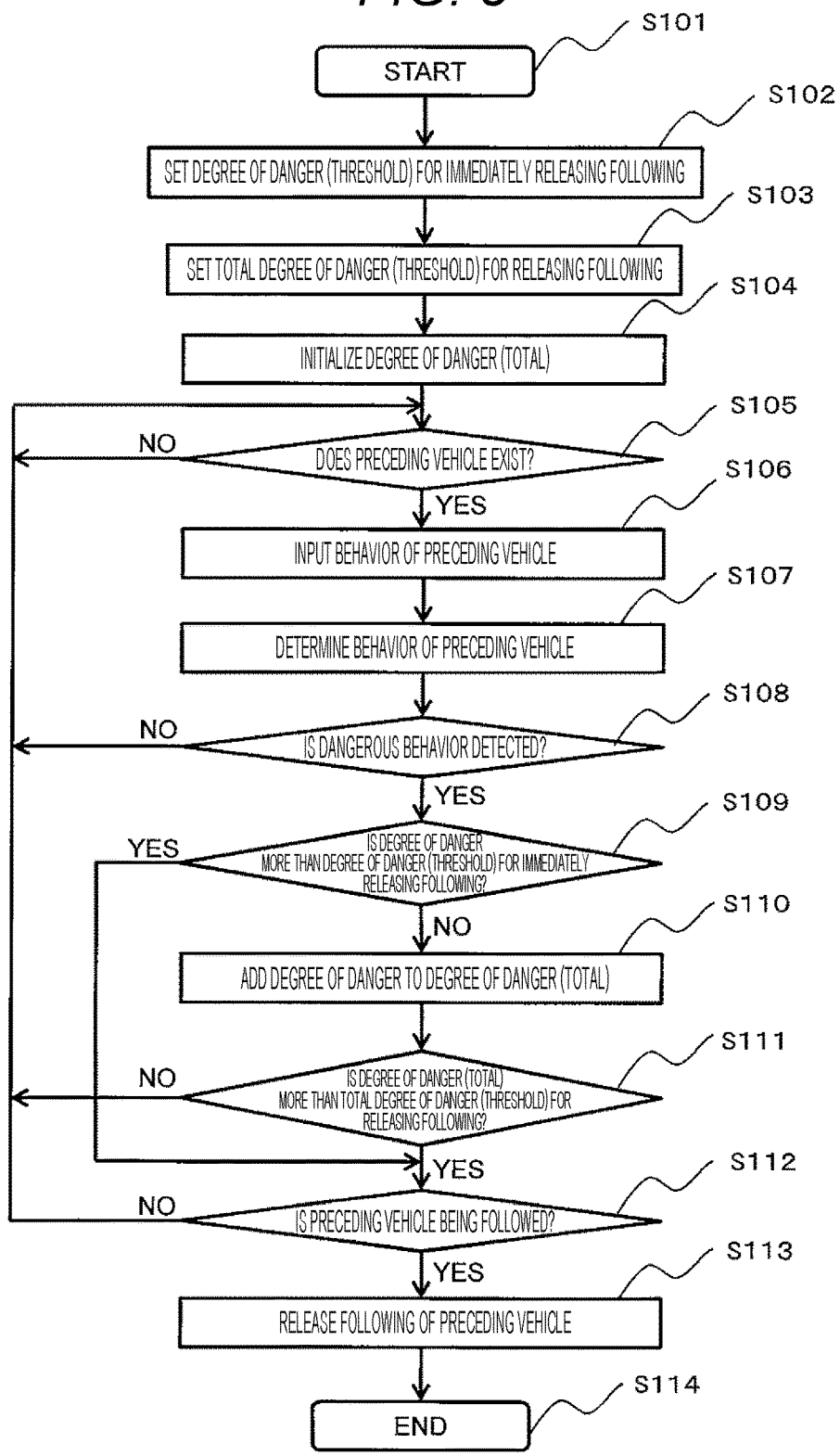

VEHICLE TRAVEL CONTROL DEVICE THAT CONTROLS FOLLOWING OF A VEHICLE

TECHNICAL FIELD

The present invention relates to a vehicle travel control device following a preceding vehicle, and particularly, a vehicle travel control device including a preceding vehicle following function using a sensor that recognizes behavior of a preceding vehicle.

BACKGROUND ART

Conventionally, there is a vehicle travel control device including a function of following a preceding vehicle that travels in front of a host vehicle using a sensor, such as an in-vehicle radar or an in-vehicle camera.

As a vehicle travel control device mentioned above, there is a vehicle traveling state detection device for predicting, for example, sudden acceleration and deceleration of a preceding vehicle by accurately detecting an unstable travel state of the preceding vehicle. In the vehicle traveling state detection device, a preceding vehicle unstable situation determination means determines that the preceding vehicle is in an unstable situation when at least one of a degree of unsteadiness in a lateral direction of the preceding vehicle, a degree of bias in the traveling lane of the preceding vehicle, and an amount of lateral displacement per unit time of the preceding vehicle is a predetermined specified value or more, and the means can prompt the driver of the vehicle to drive accurately (for example, refer to PTL 1).

CITATION LIST

Patent Literature

PTL 1: JP 2004-220348 A

SUMMARY OF INVENTION

Technical Problem

However, the vehicle traveling state detection device described in PTL 1 detects an unstable situation in a pattern in which the lateral position in the lane width direction of a preceding vehicle is chronologically followed. Therefore, even when a driver of a preceding vehicle performs a temporary handle operation, such as avoiding a bad road surface or an obstacle, following control is released and the driver may be annoyed.

The present invention has been made in view of the above problems, and it is an object of the present invention to provide a vehicle travel control device that detects the dangerous behavior of a preceding vehicle and differentiates the release timing of the following control such as to improve the practical use of the following control.

Solution to Problem

In order to achieve the purpose mentioned above, a vehicle travel control device according to the present invention is a vehicle travel control device that controls following and releasing following targeting a preceding vehicle, wherein the vehicle travel control device sets a first dangerous behavior on the basis of a dangerous behavior detected by behavior information of the preceding vehicle and a second dangerous behavior different from the first dangerous behavior and performs following release control by a following control release timing set on the basis of the first dangerous behavior and a following control release timing set on the basis of the second dangerous behavior. Also, a release timing set on the basis of the first dangerous behavior and a release timing set on the basis of the second dangerous behavior are different.

To be specific, the vehicle travel control device according to the present invention, further includes:
preceding vehicle behavior recognition means that obtains behavior information of a preceding vehicle;
preceding vehicle behavior determination means that determines the feasibility of following control targeting the preceding vehicle on the basis of the type and degree of danger of the detected dangerous behavior; and vehicle operation control means that outputs an acceleration/deceleration/braking/steering control command to an actuator on the basis of the feasibility determination for the following control.

The vehicle travel control device of the present invention configured as described above determines the degree of danger on the basis of the type and frequency of the dangerous behavior of the preceding vehicle and immediately releases the following control when detecting a dangerous behavior with a high degree of danger, and when detecting a dangerous behavior with a low degree of danger, for example, the following control is canceled when the total degree of danger exceeds the threshold, it is possible to suppress erroneous releasing according to the dangerous behavior of the preceding vehicle, and following traveling becomes possible.

Advantageous Effects of Invention

According to the present invention, a vehicle travel control device in which the practical use of the following control is improved by releasing following at a timing when the type and degree of danger of dangerous behavior are determined, can be provided. In addition, in the following release determination, it is possible to improve the determination accuracy by monitoring the type and degree of danger of the dangerous behavior and the total and frequency of the dangerous behavior, and erroneous release of the following control of the host vehicle by the temporary driving operation of the preceding vehicle driver can be suppressed. For example, when the preceding vehicle becomes unsteady once, the behavior of the preceding vehicle is stored only by the preceding vehicle behavior determination means, and when it is detected that the unsteadiness is repeated, the following control can be released by determining as a dangerous behavior.

BRIEF DESCRIPTION OF DRAWINGS

FIG. 1 is a block diagram illustrating an exemplary configuration of an in-vehicle system using a vehicle travel control device according to the present invention.

FIG. 2 is a list of dangerous behavior for determining behavior information of a preceding vehicle according to the present invention.

FIG. 3 is a flowchart for explaining a control of Example 1 in a preceding vehicle behavior determination based on a threshold of a degree of danger according to the present invention.

DESCRIPTION OF EMBODIMENTS

Figure 4:
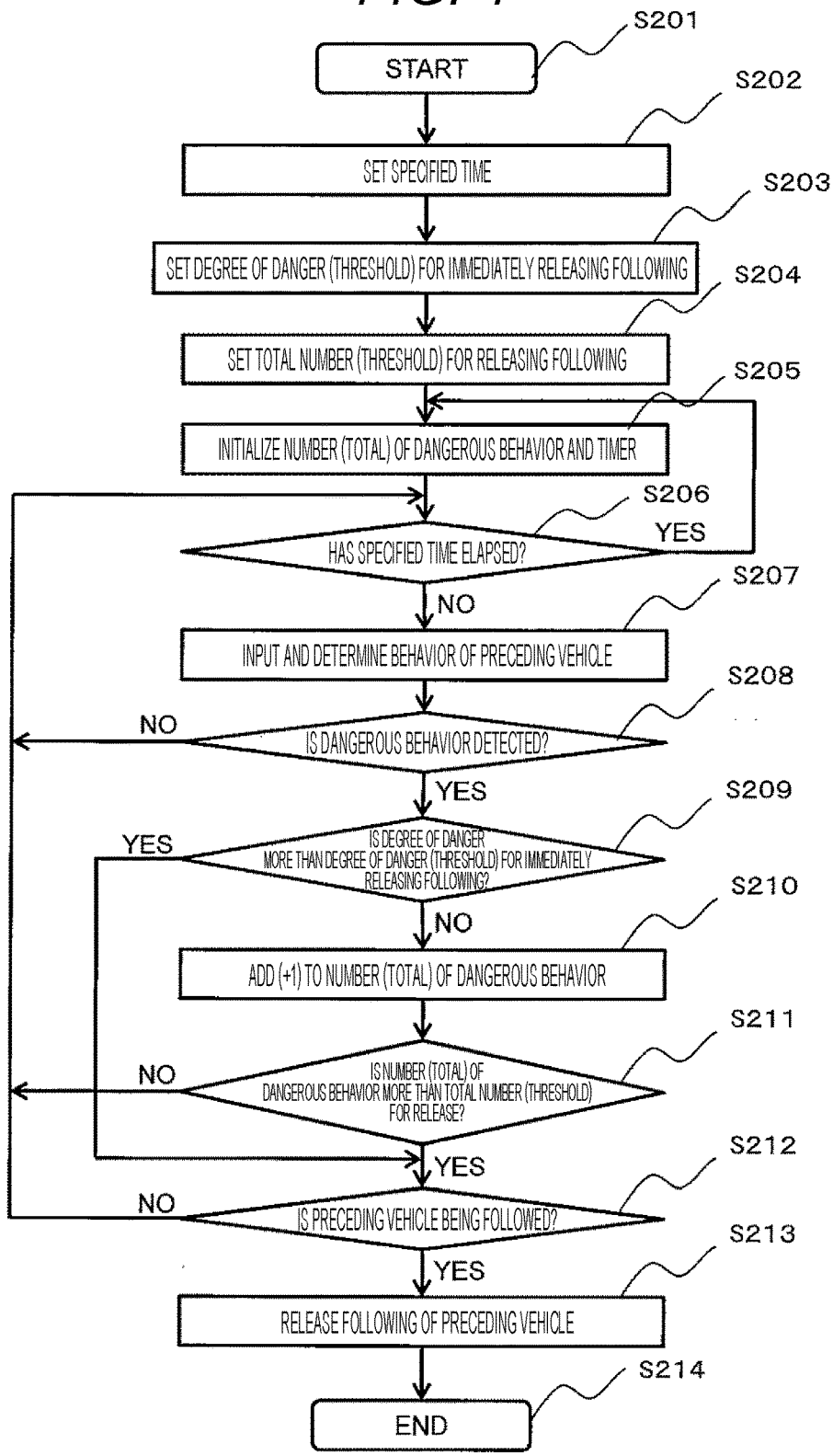
FIG. 4 is a flowchart for explaining a control of Example 2 in a preceding vehicle behavior determination based on the frequency of a dangerous behavior according to the present invention.

An embodiment of a vehicle travel control device according to the present invention is hereinafter described with reference to FIGS. 1 through 4.

Example 1

FIG. 1 is a block diagram illustrating an exemplary configuration of an in-vehicle system using a vehicle travel control device according to the present invention.

In FIG. 1, an in-vehicle system according to the present invention includes an external recognition sensor 1 for inputting behavior of a preceding vehicle, a vehicle travel control device 2 that recognizes the behavior of the preceding vehicle and determines whether the behavior is dangerous behavior, an actuator 3 that controls acceleration/deceleration/braking/steering angle of a host vehicle following a moving path of the preceding vehicle, and a vehicle travel information means 4 that can obtain a driving state, such as the vehicle speed and the steering angle of the host vehicle.

The external recognition sensor 1 is a device for detecting objects existing in the surroundings of the host vehicle and includes, for example, a camera, a radar, and a sensor, such as an infrared sensor installed on the front surface of the host vehicle. The external recognition sensor 1 can detect behavior, such as the position and the vehicle speed of the preceding vehicle traveling in front of the host vehicle. The external recognition sensor 1 detects behavior of the preceding vehicle and can be, for example, LIDAR or ultrasonic device as long as the sensor can obtain information. An information receiving device may be for, for example, vehicle-to-vehicle communication or road-vehicle-communication.

The vehicle travel control device 2 is a computer for controlling automobiles including, for example, a microprocessor, a memory storing a program or control information, and a module for communicating with a peripheral device, and includes a preceding vehicle behavior recognition means 21, a preceding vehicle behavior determination means 22, and a vehicle operation control means 23. The vehicle travel control device 2 is a device that inputs a preceding vehicle detected by the external recognition sensor 1 and behavior information of surrounding objects of the vehicle, and controls the actuator 3, for the accelerator, the brake, and the steering etc. of the host vehicle according to the determination result of the behavior information.

The preceding vehicle behavior recognition means 21 is a processing program that obtains and recognizes information of surrounding objects of the vehicle including the preceding vehicle detected by the external recognition sensor 1 and recognizes the behavior state of the preceding vehicle. The preceding vehicle behavior determination means 22 is a processing program that analyzes preceding vehicle behavior information on the basis of the behavior state recognized by the preceding vehicle behavior recognition means 21, detects a type and degree of danger of dangerous behavior of the preceding vehicle, determines whether the degree of danger itself or the total degree of danger is more than a set degree of danger for releasing following or more, and outputs a preceding vehicle following release signal when the degree of danger is the degree of danger for releasing following or more. The vehicle operation control means 23 is a processing program for operating acceleration/deceleration/braking/steering angle etc. of the host vehicle by actuating/controlling the actuator 3 via an in-vehicle network on the basis of an output signal (including the preceding vehicle following release signal) of the preceding vehicle behavior determination means 22 and information of the host vehicle output from the vehicle travel information means 4.

The actuator 3 is a device that controls the basic operation of the host vehicle relating to the accelerator, the brake, and the steering relating. The accelerator, the brake, and the steering of the actuator 3 are controlled by the vehicle travel control device 2 and drive the host vehicle.

The vehicle travel information means 4 is an information means in which an in-vehicle device can obtain traveling information, such as the vehicle speed and the steering angle of the host vehicle via the in-vehicle network, such as a controller area network (CAN). Information of the vehicle speed and the steering angle etc. of the vehicle travel information means 4 is provided to a vehicle control device 2 and used by the preceding vehicle behavior recognition means 21, the preceding vehicle behavior determination means 22, and the vehicle operation control means 23.

Next, a method for determining whether it is the dangerous behavior by the behavior information of the preceding vehicle will be described.

A preceding vehicle following function is a function to support driving by a driver by controlling the accelerator, the brake, and the steering of the host vehicle so that the host vehicle follows the behavior of the preceding vehicle. This technology is based on the premise that safe autonomous operation can be secured by cooperating with the traveling speed and traveling locus of the preceding vehicle. However, if the preceding vehicle continues reckless driving or driving not matching the condition of the surrounding road, the safety of the host vehicle following the preceding vehicle is significantly reduced.

FIG. 2 is a list of dangerous behavior for determining a driving situation of a preceding vehicle. In the description of the dangerous behavior, the degree of danger varies depending on the traveling ability of the vehicle, and therefore quantitative figures are not mentioned. In FIG. 2, degree of danger of various dangerous behavior is illustrated in 1 to 5 stages and the determination target and determination method of each dangerous behavior are also illustrated.

In FIG. 2, determination of excess of the speed limit according to the dangerous behavior is based on detection of the vehicle speed of the preceding vehicle and whether the vehicle speed exceeds the speed limit (legal limit) of the road that the preceding vehicle is traveling. A degree of danger of driving related to the preceding vehicle is determined on the basis of the magnitude of the excessive speed. To be specific, "excess of the speed limit" is highly dangerous, and therefore, the degree of danger is set to 5. However, the degree of danger can be changed depending on the magnitude of the excessive speed. Also, the determination on the degree of danger of a sudden acceleration/deceleration according to the dangerous behavior is based on detection of change in the vehicle speed of the preceding vehicle within a specified time and whether a sudden acceleration rate change has occurred. To be specific, the degree of danger of "sudden acceleration" is set to "2 to 1". The sudden deceleration can be determined as more dangerous than the sudden acceleration because the host vehicle may collide with the preceding vehicle. To be specific, the degree of danger of "sudden deceleration" is set to "5 to 3".

The determination on the degree of danger of abrupt steering according to the dangerous behavior is based on the degree of turning with speed which is obtained by detecting the vehicle speed of the preceding vehicle and the steering angle that can be estimated from a positional change of the preceding vehicle. To be specific, the degree of danger of "abrupt steering" is set to "5 to 3". Also, the determination on the degree of danger of unsteadiness according to the dangerous behavior is based on the degree of unsteadiness within a specified time obtained by detecting a positional change of the preceding vehicle. To be specific, the degree of danger of "unsteadiness" is set to "5 to 1".

The determination on non-keeping of lane according to the dangerous behavior is based on whether the preceding vehicle is traveling within a lane obtained by detecting the position of the preceding vehicle. In order to determine a temporary crossing-over of the lane for, for example, avoiding obstacles or changing lanes, the degree of danger is determined on the basis of the rate (keeping rate) of time the preceding vehicle has maintained its position within the lane within a prescribed amount of time. To be specific, the degree of danger of "non-keeping of lane" is set to "5 to 3". Also, the determination of too slow (fast) driving according to the dangerous behavior is based on magnitude of the vehicle speed difference by detecting vehicle speeds of the preceding vehicle and surrounding vehicles, and thereafter, whether the driving matches with the surrounding traffic condition. To be specific, the degree of danger of "too slow (fast) vehicle speed" is set to "3 to 1".

The determination of the dangerous behavior mentioned above is processed by the preceding vehicle behavior recognition means 21 and the preceding vehicle behavior determination means 22 of the vehicle travel control device 2 on the basis of the behavior information of surrounding vehicles, especially, the information on the preceding vehicle obtained by the external recognition sensor 1.

FIG. 3 is a flowchart for explaining control of Example 1 of the vehicle travel control device according to the present invention and illustrates a preceding vehicle behavior determination based on a danger degree threshold when the degree of danger of the dangerous behavior of the preceding vehicle is high and low.

The vehicle travel control device 2 starts the flowchart in FIG. 3 at a timing to start the preceding vehicle following function by the operation by driver of the host vehicle (step S101).

In Example 1, performing of the preceding vehicle following function is released when the degree of danger of the dangerous behavior of the preceding vehicle is high and the dangerous behavior reaches a preset limit. Therefore, a danger degree threshold according to a condition for releasing the preceding vehicle following performance. The threshold is set for a degree of danger (threshold) for immediately releasing following (step S102) and a total degree of danger (threshold) for releasing following (step S103). By giving choices of a standard value and some other values from the in-vehicle system, the danger degree threshold may be selected by the driver of the host vehicle with their own decision. In Example 1, the threshold of total degree of danger is set to "5".

Also, at the timing to start the preceding vehicle following function, information for summing up the degree of danger during performance of the preceding vehicle following function is initialized step S104).

Next, the preceding vehicle behavior recognition means 21 of the vehicle travel control device 2 obtains information obtained by the external recognition sensor 1 and checks for the existence of a preceding vehicle (step S105). At the timing when there is no preceding vehicle, the information obtained by the external recognition sensor 1 is repeatedly obtained until a preceding vehicle exists, because the dangerous behavior of a preceding vehicle cannot be determined (NO in step S105).

When a preceding vehicle exists (YES in step S105), the preceding vehicle behavior is input (step S106) and determines whether the behavior matches the dangerous behavior in FIG. 2 on the basis of the behavior information of the preceding vehicle in the preceding vehicle behavior determination means 22 of the vehicle travel control device 2 (step S107). When the dangerous behavior is not detected, next information of the external recognition sensor 1 is obtained (NO in step S108). The detection of the dangerous behavior is set according to the type and degree of danger of dangerous behavior.

When the dangerous behavior is determined (YES in step S108), it is determined that whether the degree of danger is more than a danger degree threshold for immediately releasing following. When the degree of danger is more than the threshold and is a first dangerous behavior (YES in step S109), whether a preceding vehicle is being followed is checked, and if the preceding vehicle is being followed (YES in S112), following of preceding vehicle is released (step S113). This timing is a first release timing of the following control when the first dangerous behavior is detected. As mentioned above, when the type of degree of danger is an immediate release, the degree of danger is determined as extremely high, and immediately release following at this timing. In Example 1, the threshold is set to "5" and when the preceding vehicle is behaving dangerously by exceeding the speed limit, the dangerous behavior is the degree of danger "5" in FIG. 2 and following is immediately released.

When the danger degree threshold for immediately releasing following is not the threshold or more (NO in step S109), the degree of danger calculated on the basis of weighting of this dangerous behavior is added to the information of degree of danger initialized in step S104 and the information of degree of danger is summed up (step S110). Information of the detected dangerous behavior may be notified to the driver of the host vehicle with an audio or visual message.

After the total degree of danger is calculated, it is determined whether the total degree of danger has reached the total danger degree threshold set in step S103. When the total danger degree has not reached the threshold, next information of the external recognition sensor is obtained (NO in step S111). When the total dangerous behavior of a preceding vehicle has reached the threshold ("5" in Example 1) (YES in step S111), whether a preceding vehicle is being followed is checked in step S112, and if the preceding vehicle is not being followed, next information of the external recognition sensor 1 is obtained (NO in step S112).

When the total dangerous behavior of a preceding vehicle has reached the threshold during following (YES in step S111), the preceding vehicle following function is released (steps S112 and S113). This timing is a second release timing of following control when a second dangerous behavior is detected, and is different timing than the first release timing in which the first dangerous behavior is detected. In a case of releasing the preceding vehicle following function, this may be notified to the driver of the host vehicle with an audio or visual message. In Example 1, for example, the preceding vehicle suddenly accelerates and does an abrupt steering, the degree of danger of sudden acceleration is "2" and the degree of danger of abrupt steering is "3" and therefore the total degree of danger becomes "5". Therefore, following release is performed and control to the actuator 3 is released. Note that although the total degree of danger is added in step S111 in a case of NO in step S109, if a highly dangerous behavior is detected afterwards, following is immediately released in step S109 and also following is released due to the total number in step S111, therefore, the first and second timings may be at the same time.

In a case of Example 1, the degree of danger is detected on the basis of the behavior information of the preceding vehicle, and when the degree of dangerous behavior is high, following is immediately released at the first release timing and when the degree of dangerous behavior is low, following is released at the second release timing when the degree of danger (total) exceeds the threshold of the total degree of danger for releasing following by determining the total degree of danger. On the basis of the type of dangerous behavior and the total degree of danger, following of the preceding vehicle is released at two different timings. Therefore, the accuracy of detecting the dangerous behavior can be improved and an erroneous release of following control of the host vehicle by a temporarily driving operation of the preceding vehicle driver can be suppressed. Also, following traveling is released when the preceding vehicle behaves dangerously, and therefore, dangerous following traveling can be prevented.

Example 2

Next Example 2 of a vehicle travel control device 2 according to the present invention will be described. The basic configuration of an in-vehicle system is the same as that of the in-vehicle system in Example 1. However, in Example 2, a method of determining dangerous behavior in a preceding vehicle behavior determination means of the vehicle travel control device 2 is different from that in Example 1.

FIG. 4 is a flowchart for explaining control of Example 2 of the vehicle travel control device according to the present invention and illustrates a preceding vehicle behavior determination based on the dangerous behavior frequency when the degree of danger of the dangerous behavior of the preceding vehicle is high and low.

The vehicle travel control device 2 starts the flowchart in FIG. 4 at a timing to start the preceding vehicle following function by the operation of the driver of the host vehicle (step S201).

In Example 2, performing of the preceding vehicle following function is released when the degree of danger of the dangerous behavior of the preceding vehicle is high and on the basis of occurrence of frequency of the dangerous behavior. Therefore, a specified time for counting the number of occurrences of the dangerous behavior related to the condition for releasing the preceding vehicle following and a degree of danger for immediately releasing following for when a degree of danger is high are set, and at the same time a threshold of a number of occurrences (following release total number) is first set (steps S202 to S204). By giving choices of a standard value and some other values, the specified time and the threshold of occurrence of frequency may be selected by the driver of the host vehicle with their own decision.

Also, information for summing up the number of dangerous behaviors during performing of the preceding vehicle following function is initialized, and a timer for measuring the specified time set in step S202 is initialized and started (step S205).

Next, it is determined whether the specified time has elapsed on the above-mentioned timer (step S206). When the specified time has elapsed (YES in step S206), the processing returns to step S205, and the number of dangerous behaviors (total) is initialized and the specified time measurement timer is initialized and restarted.

The means for determining whether a preceding vehicle exists on the basis of the information obtained by the external recognition sensor 1 when the specified time has not elapsed on the timer (NO in step S206), and the means for determining whether the dangerous behavior in FIG. 2 has been detected (step S207) are the same as steps S105 and S107 in Example 1.

When the dangerous behavior of the preceding vehicle is determined (YES in step S208), it is determined whether the degree of danger is more than the degree of danger (threshold) for immediately releasing following. When the degree of danger is more than the threshold (YES in step S209), whether a preceding vehicle is being followed is checked, and if the preceding vehicle is being followed (YES in S212), following of preceding vehicle is released (step S213). This timing is a first release timing of the following control when the first dangerous behavior is detected. As mentioned above, when the type of degree of danger is an immediate release, the degree of danger is determined as extremely high, and immediately release following at this timing.

When the degree of danger is not equal to or higher than the degree of danger (threshold) for immediately releasing following (NO in step S209), the number of dangerous behaviors initialized in step S205 is incremented (step S210). Information of the detected dangerous behavior may be notified to the driver with an audio or visual message. When the dangerous behavior cannot be detected, the processing returns to step S206 and the elapsed time of the timer is checked (step S206).

When the degree of danger for immediately releasing following is not the threshold or more (NO in step S209), after the number of dangerous behavior is incremented in step S210, it is determined whether the threshold of the number of dangerous behavior set in step S204 has been reached. When the threshold has not yet been reached (NO in step S211), the processing returns to step S206 and the elapsed time of the timer is checked.

When the number of dangerous behaviors of the preceding vehicle has reached the threshold (YES in step S211), whether a preceding vehicle is being followed is checked in step S212, and if the preceding vehicle is not being followed (NO in step S212), the processing returns to step S206, and the elapsed time of the timer is checked.

When the total number of dangerous behaviors of the preceding vehicle has reached the threshold (YES in step S211), that is, when the occurrence frequency of the dangerous behavior reaches the threshold, similarly to steps S112 and S113 in Example 1, the preceding vehicle following function is released (step S212 and step S213). As described above, on the basis of the frequency of the dangerous behavior (total number), the following is released at the timing when the total number of the dangerous behavior reaches the threshold and this is a second release timing which is different from the first release timing. For example, when the degree of danger of the dangerous behavior in FIG. 2 is high, the frequency of the dangerous behavior (total number) is set so as to exceed the threshold with a small number of times, and when the degree of danger is low, the frequency is set so as not to exceed the threshold immediately. The frequency of the dangerous behavior (total number) can preferably be changed as appropriate.

In a case of Example 2, the dangerous behavior is detected on the basis of the behavior information of the preceding vehicle, and when the degree of dangerous behavior is high, following is immediately released at the first release timing and when the degree of dangerous behavior is low, following is released at the second release timing when the total number of dangerous behaviors exceeds the threshold by determining the occurrence frequency of dangerous behavior. On the basis of the type and occurrence frequency of dangerous behavior, following of a preceding vehicle is released at two different timings. Therefore, an accuracy of detecting the dangerous behavior can be improved and an erroneous release of following control of the host vehicle by a temporary driving operation of the preceding vehicle driver can be suppressed. Also, following traveling is released when the preceding vehicle behaves dangerously, and therefore, dangerous following traveling can be prevented.

Although the embodiments of the present invention have been described above in detail, the present invention is not limited to the embodiments described above, and various design changes may be made as long as it does not depart from the spirit of the present invention described in the claims. For example, although an example of indicating the degree of dangerous behavior in 1 to 5 stages is described, it is not limited to this example, and may be indicated in stages 1 to 3 or in other stages.

Further, in the example described above, although an example of releasing of following when a highly dangerous behavior is once detected as the first release timing is described, it may be configured to, as the first release timing, release the following when the highly dangerous behaviors are detected twice and, as the second timing, when dangerous behaviors with low degree of danger are detected, for example, five times in total.

Further, a part of the configuration of one example can be replaced by the configuration of another example, and the configuration of another example can be added to the configuration of one example. Further, it is possible to add, delete, and replace other configurations with respect to apart of the configuration of each example.

REFERENCE SIGNS LIST 1 external recognition sensor
2 vehicle travel control device
21 preceding vehicle behavior recognition means
22 preceding vehicle behavior determination means
23 vehicle operation control means
3 actuator
4 vehicle travel information means

The invention claimed is:

1. A vehicle travel control device that controls following and releasing following targeting a preceding vehicle, wherein
the vehicle travel control device sets a first dangerous behavior on the basis of a dangerous behavior detected by behavior information of the preceding vehicle and a second dangerous behavior different from the first dangerous behavior and performs following release control by a following control release timing set on the basis of the first dangerous behavior and a following control release timing set on the basis of the second dangerous behavior, wherein
preceding vehicle behavior recognition means that obtains behavior information of a preceding vehicle;
preceding vehicle behavior determination means that determines the feasibility of following control targeting the preceding vehicle on the basis of the detected dangerous behavior; and
vehicle operation control means that outputs an acceleration/deceleration/braking/steering control command to an actuator on the basis of the feasibility determination for the following control, and
the preceding vehicle behavior determination means determines to release following control targeting the preceding vehicle at the release timing of the second dangerous behavior in which the occurrence frequency of the detected dangerous behavior reaches a predetermined threshold.

2. The vehicle travel control device according to claim 1, wherein
a release timing set on the basis of the first dangerous behavior and a release timing set on the basis of the second dangerous behavior are different.

3. The vehicle travel control device according to claim 1, wherein
the first dangerous behavior is set on the basis of the type and degree of danger of the dangerous behavior.

4. The vehicle travel control device according to claim 1, wherein
the second dangerous behavior is set on the basis of the type and total degree of danger of the dangerous behavior or the occurrence frequency of the dangerous behavior.

5. The vehicle travel control device according to claim 1, wherein
the preceding vehicle behavior determination means determines to release following control targeting the preceding vehicle at a release timing of the second dangerous behavior in which the total degree of danger of the detected dangerous behavior reaches a predetermined threshold.

6. The vehicle travel control device according to claim 1, wherein
the dangerous behavior is at least one of excess of the speed limit, sudden acceleration, sudden deceleration, abrupt steering, unsteadiness, non-keeping of lane, excessively slow vehicle speed, and excessively fast vehicle speed.

7. The vehicle travel control device according to claim 1, wherein
the preceding vehicle behavior determination means determines the feasibility of following control targeting the preceding vehicle on the basis of the type and degree of danger of the dangerous behavior and the total degree of danger or the occurrence frequency of the dangerous behavior.

8. The vehicle travel control device according to claim 7, wherein
when the following control is negative, the release timing of the following control is different depending on the type and degree of danger of the dangerous behavior and the total degree of danger or the occurrence frequency of the dangerous behavior.

* * * * *